United States Patent
Ganapathy

(10) Patent No.: US 12,307,309 B2
(45) Date of Patent: May 20, 2025

(54) SYSTEM AND METHOD TO GENERATE A SECURE CODE FOR AUTHENTICATING A PRODUCT

(71) Applicant: Babu Ganapathy, Redmond, WA (US)

(72) Inventor: Babu Ganapathy, Redmond, WA (US)

(73) Assignee: Babu Ganapathy, Redmond, WA (US)

( * ) Notice: Subject to any disclaimer, the term of this patent is extended or adjusted under 35 U.S.C. 154(b) by 0 days.

(21) Appl. No.: 18/516,960

(22) Filed: Nov. 22, 2023

(65) Prior Publication Data

US 2024/0362448 A1    Oct. 31, 2024

Related U.S. Application Data

(60) Provisional application No. 63/461,916, filed on Apr. 26, 2023.

(51) Int. Cl.
| | | |
|---|---|---|
| *G06K 19/06* | (2006.01) | |
| *G06K 7/14* | (2006.01) | |
| *G06T 1/00* | (2006.01) | |

(52) U.S. Cl.
CPC ..... *G06K 19/06037* (2013.01); *G06K 7/1417* (2013.01); *G06K 7/1452* (2013.01); *G06T 1/0021* (2013.01)

(58) Field of Classification Search
CPC .......... G06K 19/06037; G06K 7/1417; G06K 7/1452; G06T 1/0021
See application file for complete search history.

(56) References Cited

U.S. PATENT DOCUMENTS

2017/0076191 A1*    3/2017    Feng ................ G06K 19/06037

FOREIGN PATENT DOCUMENTS

| WO | 2016135682 A1 | 9/2016 |
|---|---|---|
| WO | 2017116303 A1 | 7/2017 |
| WO | 2022094635 A1 | 5/2022 |

OTHER PUBLICATIONS

Tianyu Wang, Hong Zheng, Changhui You and Jianping Ju, A Texture-Hidden Anti-Counterfeiting QR Code and Authentication Method, Jan. 10, 2023.
Yulong Yan, Zhuo Zou, Hui Xie, Yu Gao, and Lirong Zheng, An IoT-Based Anti-Counterfeiting System Using Visual Features on QR Code, Apr. 15, 2021.

* cited by examiner

*Primary Examiner* — Matthew Mikels
(74) *Attorney, Agent, or Firm* — Jason C. Cameron

(57) ABSTRACT

System to generate a secure code for authenticating a product is provided. The system includes a processing subsystem including a code generation module to generate a code based on product details. The processing subsystem includes a watermarking module to watermark points in the code. The processing subsystem includes a visible pattern generation module to generate a visible pattern. The processing subsystem includes a concealed pattern generation module to store a concealed pattern including second control points. The processing subsystem includes an overlay module to provide the secure code. The processing subsystem includes a scanning module to analyze the secure code to obtain the first points and discrete points. The scanning module is to interconnect the first points and the discrete points to obtain a reconstructed pattern including third control points. The scanning module is to compare the third control points with the second control points to authenticate the secure code.

19 Claims, 6 Drawing Sheets

SYSTEM AND METHOD TO GENERATE A SECURE CODE FOR AUTHENTICATING A PRODUCT

EARLIEST PRIORITY DATE

This application claims priority from a Provisional patent application filed in the United States of America having Patent Application No. 63/461,916, filed on Apr. 26, 2023, and titled "SMART SECURED QR CODE WITH DYNAMIC PATTERN-BASED ANTI-COUNTERFEITING SYSTEM."

FIELD OF INVENTION

Embodiments of the present disclosure relate to a field of data processing and more particularly to a system and method to generate a secure code for authenticating a product.

BACKGROUND

Counterfeit products are replica goods designed to resemble genuine goods manufactured by established brands. The counterfeit products are made and sold without authorization from legitimate brand owners and are intended to mimic the genuine goods in appearance and functionality. The counterfeit products are created to reap profit by utilizing the brand names of the genuine goods.

Conventionally, quick response codes and holograms are used by the manufacturers to authenticate the genuine goods. However, the quick response codes and the holograms are reproducible by the manufacturers of the counterfeit products, thereby undermining the efficiency of the quick response codes and holograms in the fight against the counterfeit products. Even though engraving additional graphical elements in the quick response codes and the holograms provides an extra layer of security, the engraving process requires additional printing equipment, thereby increasing an associated cost.

Hence, there is a need for a system and method to generate a secure code for authenticating a product to address the aforementioned issue(s).

BRIEF DESCRIPTION

In accordance with an embodiment of the present disclosure, a system to generate a secure code for authenticating a product is provided. The system includes a processing subsystem hosted on a server and configured to execute on a network to control bidirectional communications among a plurality of modules. The processing subsystem includes a data acquisition module configured to acquire a plurality of product details associated with the product from a user. The processing subsystem also includes a code generation module configured to generate a code based on the plurality of product details. The processing subsystem further includes a watermarking module operatively coupled to the code generation module. The watermarking module is configured to watermark a first plurality of points in the code based on the plurality of product details. The processing subsystem also includes a visible pattern generation module operatively coupled to the code generation module. The visible pattern generation module is configured to analyze the plurality of product details to estimate a first plurality of control points and a plurality of anchor points. The visible pattern generation module is also configured to generate a visible pattern based on the first plurality of control points and the plurality of anchor points estimated. The processing subsystem also includes a concealed pattern generation module operatively coupled to the visible pattern generation module. The concealed pattern generation module is configured to store a concealed pattern generated based on the first plurality of points and the visible pattern in an integrated database. The concealed pattern includes a second plurality of control points. The processing subsystem also includes an overlay module operatively coupled to the pattern generation module. The overlay module is configured to overlay the visible pattern on the code to provide the secure code. The processing subsystem also includes a scanning module operatively coupled to the overlay module. The scanning module is configured to capture the secure code associated with the product using at least one image sensor associated with a user device. The scanning module is also configured to analyze the secure code using a key to calculate a value for regenerating the code. The scanning module is also configured to subtract the code regenerated from the secure code to obtain the first plurality of points and a plurality of discrete points. The scanning module is further configured to interconnect the first plurality of points and the plurality of discrete points based on a predefined logic to obtain a reconstructed pattern including a third plurality of control points. The scanning module is also configured to compare the third plurality of control points with the second plurality of control points to obtain a similarity score. The scanning module is also configured to authenticate the secure code when the similarity score obtained is above a predefined threshold, thereby authenticating the product.

In accordance with another embodiment of the present disclosure, a method to generate a secure code for authenticating a product is provided. The method includes acquiring, by a data acquisition module, a plurality of product details associated with the product from a user. The method also includes generating, by a code generation module, a code based on the plurality of product details. The method also includes watermarking, by a watermarking module, a first plurality of points in the code based on the plurality of product details. The method also includes analyzing, by a visible pattern generation module, the plurality of product details to estimate a first plurality of control points and a plurality of anchor points. The method also includes generating, by the visible pattern generation module, a visible pattern based on the first plurality of control points and the plurality of anchor points estimated. The method also includes storing, by a concealed pattern generation module, a concealed pattern generated based on the first plurality of points and the visible pattern in an integrated database. The concealed pattern includes a second plurality of control points. The method also includes overlaying, by an overlay module, the visible pattern on the code to provide the secure code. The method also includes capturing, by a scanning module, the secure code associated with the product using at least one image sensor associated with a user device. The method also includes analyzing, by the scanning module, the secure code using a key to calculate a value for regenerating the code. The method also includes subtracting, by the scanning module, the code regenerated from the secure code to obtain the first plurality of points and a plurality of discrete points. The method also includes interconnecting, by the scanning module, the first plurality of points and the plurality of discrete points based on a predefined logic to obtain a reconstructed pattern including a third plurality of control points. The method also includes comparing, by the scanning module, the third plurality of control points with the second plurality of control points to obtain a similarity score. The method further includes authenticating, by the scanning module, the secure code when the similarity score obtained is above a predefined threshold, thereby authenticating the product.

In accordance with another embodiment of the present disclosure, a non-transitory computer-readable medium storing a computer program that, when executed by a processor, causes the processor to perform a method to generate a secure code for authenticating a product is provided. The method includes acquiring, by a data acquisition module, a plurality of product details associated with the product from a user. The method also includes generating, by a code generation module, a code based on the plurality of product details. The method also includes watermarking, by a watermarking module, a first plurality of points in the code based on the plurality of product details. The method also includes analyzing, by a visible pattern generation module, the plurality of product details to estimate a first plurality of control points and a plurality of anchor points. The method also includes generating, by the visible pattern generation module, a visible pattern based on the first plurality of control points and the plurality of anchor points estimated. The method also includes storing, by a concealed pattern generation module, a concealed pattern generated based on the first plurality of points and the visible pattern in an integrated database. The concealed pattern includes a second plurality of control points. The method also includes overlaying, by an overlay module, the visible pattern on the code to provide the secure code. The method also includes capturing, by a scanning module, the secure code associated with the product using at least one image sensor associated with a user device. The method also includes analyzing, by the scanning module, the secure code using a key to calculate a value for regenerating the code. The method also includes subtracting, by the scanning module, the code regenerated from the secure code to obtain the first plurality of points and a plurality of discrete points. The method also includes interconnecting, by the scanning module, the first plurality of points and the plurality of discrete points based on a predefined logic to obtain a reconstructed pattern including a third plurality of control points. The method also includes comparing, by the scanning module, the third plurality of control points with the second plurality of control points to obtain a similarity score. The method further includes authenticating, by the scanning module, the secure code when the similarity score obtained is above a predefined threshold, thereby authenticating the product.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
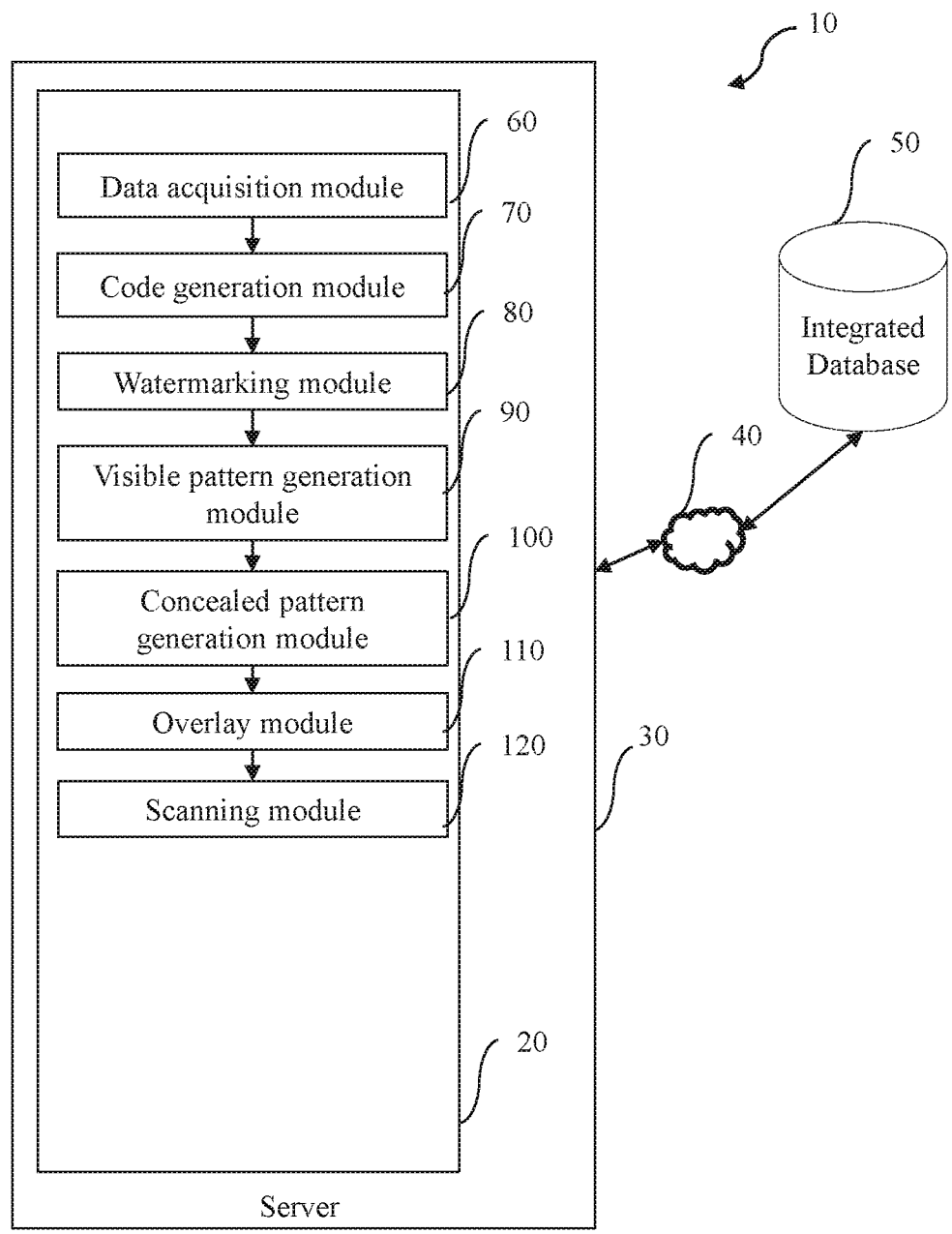
FIG. 1 is a block diagram representation of a system to generate a secure code for authenticating a product in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and method to generate a secure code for authenticating a product. The system includes a processing subsystem hosted on a server and configured to execute on a network to control bidirectional communications among a plurality of modules. The processing subsystem includes a data acquisition module configured to acquire a plurality of product details associated with the product from a user. The processing subsystem also includes a code generation module configured to generate a code based on the plurality of product details. The processing subsystem further includes a watermarking module operatively coupled to the code generation module. The watermarking module is configured to watermark a first plurality of points in the code based on the plurality of product details. The processing subsystem also includes a visible pattern generation module operatively coupled to the code generation module. The visible pattern generation module is configured to analyze the plurality of product details to estimate a first plurality of control points and a plurality of anchor points. The visible pattern generation module is also configured to generate a visible pattern based on the first plurality of control points and the plurality of anchor points estimated. The processing subsystem also includes a concealed pattern generation module operatively coupled to the visible pattern generation module. The concealed pattern generation module is configured to store a concealed pattern generated based on the first plurality of points and the visible pattern in an integrated database. The concealed pattern includes a second plurality of control points. The processing subsystem also includes an overlay module operatively coupled to the pattern generation module. The overlay module is configured to overlay the visible pattern on the code to provide the secure code. The processing subsystem also includes a scanning module operatively coupled to the overlay module. The scanning module is configured to capture the secure code associated with the product using at least one image sensor associated with a user device. The scanning module is also configured to analyze the secure code using a key to calculate a value for regenerating the code. The scanning module is also configured to subtract the code regenerated from the secure code to obtain the first plurality of points and a plurality of discrete points. The scanning module is further configured to interconnect the first plurality of points and the plurality of discrete points based on a predefined logic to obtain a reconstructed pattern including a third plurality of control points. The scanning module is also configured to compare the third plurality of control points with the second plurality of control points to obtain a similarity score. The scanning module is also configured to authenticate the secure code when the similarity score obtained is above a predefined threshold, thereby authenticating the product.

FIG. 1 is a block diagram representation of a system 10 to generate a secure code for authenticating a product in accordance with an embodiment of the present disclosure. The system 10 includes a processing subsystem 20 hosted on a server 30 and configured to execute on a network 40 to control bidirectional communications among a plurality of modules. In one embodiment, the network 40 may include one or more terrestrial and/or satellite networks interconnected to communicatively connect to a user device. In one embodiment, the network 40 may include a local area network. In some embodiments, the network 40 may include a wide area network.

Further, in another embodiment, the network 40 may include both wired and wireless communications according to one or more standards and/or via one or more transport mediums. In one example, the network 40 may include wireless communications according to one of the 802.11 or Bluetooth specification sets, LoRa (Long Range Radio) or another standard or proprietary wireless communication protocol. In yet another embodiment, the network 40 may also include communications over a terrestrial cellular network, including, a GSM (global system for mobile communications), CDMA (code division multiple access), and/or EDGE (enhanced data for global evolution) network. In one embodiment, the plurality of module may be associated with an integrated database 50 to store a plurality of data being manipulated by the plurality of modules. In one embodiment, the integrated database 50 may include, but not limited to, an SQL database, a non-SQL database, a hierarchical database, a columnar database and the like.

Furthermore, the processing subsystem 20 includes a data acquisition module 60 configured to acquire a plurality of product details associated with the product from a user. In one embodiment, the plurality of product details may include product ID, serial number, manufacturing date, manufacturing location, and expiry date. In some embodiments, the product may include personal care products, clothing products, food products, kitchen products, electronics products, cleaning products, health care products and the like. In a specific embodiment, the user may be a manufacture of the product. For example, consider a scenario in which the data acquisition module 60 may acquire the serial number of a laptop from the manufacturer.

Moreover, the processing subsystem 20 includes a code generation module 70 configured to generate a code based on the plurality of product details. In some embodiments, the code may include a quick response code. In a specific embodiment, the code generation module 70 may be configured to encrypt the plurality of product details to generate the code. In one embodiment, the code generation module 70 may encrypt the plurality of product details by at least one of an encryption technique including advanced encryption standard, rivest-shamir-adleman, data encryption standard, elliptic curve cryptography, a symmetric-key block cipher, rivest cipher 4, secure hash algorithm, message digest 5. In continuation with the ongoing example, the code generation module 70 may generate the quick response code corresponding to the serial number of the laptop.

Additionally, the processing subsystem 20 includes a watermarking module 80 operatively coupled to the code generation module 70. The watermarking module 80 is configured to watermark a first plurality of points in the code based on the plurality of product details. The processing subsystem 20 also includes a visible pattern generation module 90 operatively coupled to the code generation module 70. The visible pattern generation module 90 is configured to analyze the plurality of product details to estimate a first plurality of control points and a plurality of anchor points. The visible pattern generation module 90 is also configured to generate a visible pattern based on the first plurality of control points and the plurality of anchor points estimated.

Also, the processing subsystem 20 includes a concealed pattern generation module 100 operatively coupled to the visible pattern generation module 90. The concealed pattern generation module 100 is configured to store a concealed pattern generated based on the first plurality of points and the visible pattern in the integrated database 50. The concealed pattern includes a second plurality of control points. In one embodiment, the concealed pattern may be invisible with respect to the secure code. The processing subsystem 20 also includes an overlay module 110 operatively coupled to the pattern generation module. The overlay module 110 is configured to overlay the visible pattern on the code to provide the secure code.

Further, in continuation with the ongoing example, the watermarking module 80 may watermark at least 5 grid points in the quick response code. The visible pattern generation module 90 may estimate the first plurality off control points and the plurality of anchor points by analyzing the serial number. The visible pattern generation module 90 may generate the visible pattern based on the first plurality off control points and the plurality of anchor points. The concealed pattern generation module 100 may generate the concealed pattern and store the concealed pattern in the integrated database 50. The concealed pattern may have the second plurality of control points. The concealed pattern generation module 100 may generate the concealed pattern based on the visible pattern and the at least 5 grid points watermarked by the watermarking module 80. The overlay module 110 may further overlay the visible pattern on the quick response code to obtain the secure code.

Furthermore, the processing subsystem 20 includes a scanning module 120 operatively coupled to the overlay module 110. The scanning module 120 is configured to capture the secure code associated with the product using at least one image sensor associated with the user device. In some embodiments, the image sensor may include a camera. In one embodiment, the user device may include a phone, a computer, a personal digital assistant, a laptop and a tab. In one embodiment, the scanning module 120 may be configured to perform one or more of perspective corrections on the secure code. In such an embodiment, the one or more perspective corrections may include at least one of a horizontal perspective correction, vertical perspective correction, two point perspective correction, three point perspective correction, radial perspective correction, keystone correction, and warping correction. In some embodiments, the scanning module 120 may be configured to correct one or more distortions in the secure code. In such an embodiment, the one or more distortions may include a tilt and a skew.

Moreover, in one embodiment, the scanning module 120 may be configured to identify one or more boundaries of the secure code using a gaussian blur technique. In such an embodiment, the scanning module 120 may be configured to crop the secure code based on the one or more boundaries identified. In some embodiments, the scanning module 120 may be configured to convert one or more gray scale regions in the secure code into one or more corresponding white regions to enhance legibility of the secure code. In continuation with the ongoing example, the scanning module 120 may capture the secure code using the camera associated with the phone. The phone may be associated with an end user. The scanning module 120 may perform the horizontal perspective correction and the vertical perspective correction on the secure code to reduce minimize distortions that occurred in the secure code due to orientation of the camera while capturing the secure code. The scanning module 120 may further identify the one or more boundaries of the secure code to crop the secure code to exclude one or more regions lying around the secure code.

Additionally, the scanning module 120 is configured to analyze the secure code using a key to calculate a value for regenerating the code. In one embodiment, the key may be a combination of the plurality of product details. The scanning module 120 is also configured to subtract the code regenerated from the secure code to obtain the first plurality of points and a plurality of discrete points. The scanning module 120 is further configured to interconnect the first plurality of points and the plurality of discrete points based on a predefined logic to obtain a reconstructed pattern including a third plurality of control points. In one embodiment, the predefined logic may include one or more rules governing interconnection of the first plurality of points and the plurality of discrete points based on a corresponding position of the first plurality of points and the plurality of discrete points in a two dimensional plane.

Also, the scanning module 120 is configured to compare the third plurality of control points with the second plurality of control points to obtain a similarity score. The scanning module 120 is configured to authenticate the secure code when the similarity score obtained is above a predefined threshold, thereby authenticating the product. In continuation with the ongoing example, the scanning module 120 may analyze the secure code with the key to generate the value from the secure code. The key may be formed from the serial number of the laptop. The scanning module 120 may regenerate the code using the value. The scanning module 120 may further subtract the code from the secure code to obtain the at least 5 grid points and the plurality of discrete points. The scanning module 120 may interconnect the at least 5 grid points and the plurality of discrete points to obtain the reconstructed pattern having the third plurality of control points. The scanning module 120 may compare the second plurality of control points and the third plurality of control points to obtain the similarity score. The scanning module 120 may authenticate the secure score when the similarity score obtained is above the predefined threshold. In an exemplary embodiment, the similarity score may be 95%. In an exemplary embodiment, the scanning module 120 may authenticate the secure code by capturing a combination of a first secure code and a second secure code. In such an embodiment, the first secure code may be provided outside a product package and the second secure code may be provided inside the product package.

Figure 2:
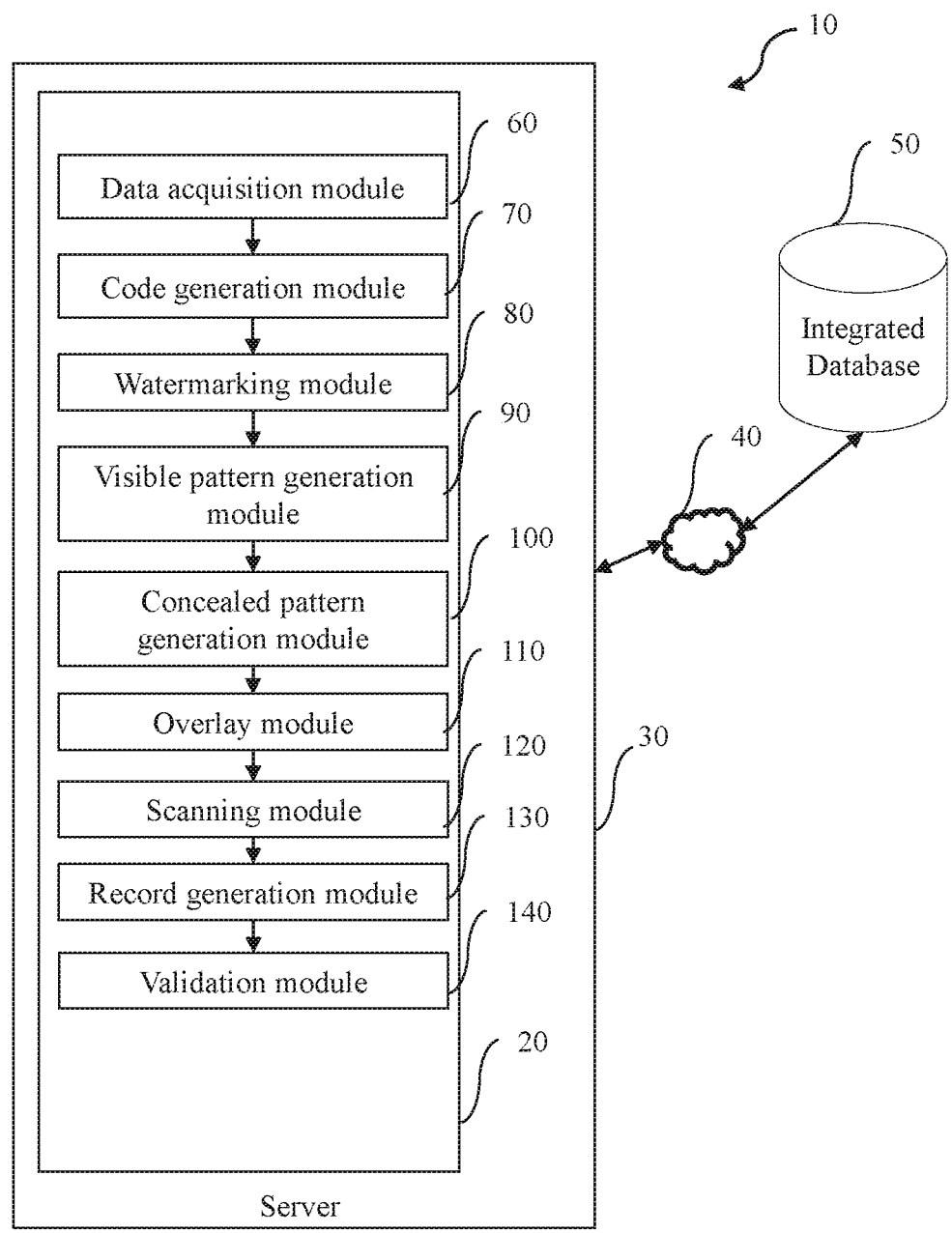
FIG. 2 is a block diagram representation of one embodiment of the system of FIG. 1, in accordance with an embodiment of the present disclosure.

FIG. 2 is a block diagram representation of one embodiment of the system 10 of FIG. 1, in accordance with an embodiment of the present disclosure. The system 10 of FIG. 1 includes the data acquisition module 60, the code generation module 70, the watermarking module 80, the visible pattern generation module 90, the concealed pattern generation module 100, the overlay module 110, and the scanning module 120. In one embodiment, the system 10 of FIG. 1 may include the processing subsystem 20 including a record generation module 130 configured to store a first hash value generated based on the concealed pattern in a blockchain network. In one embodiment, the blockchain network may include a public blockchain network, private blockchain network, consortium blockchain network, hybrid blockchain network, permissioned blockchain network, sidechain network, blockchain-as-a-service network, permissionless blockchain network, and permissioned blockchain network. In continuation with the ongoing example, the record generation module 130 may store the first hash value generated based on the concealed pattern in the blockchain network. The first hash value may be generated based on the second plurality of control points.

In some embodiments, the processing subsystem 20 may include a validation module 140 configured to calculate a second hash value based on the third plurality of control points. In such an embodiment, the validation module 140 may be configured to validate the secure code when a first hash value and the second hash value matches upon comparison. In continuation with the ongoing example, the validation module 140 may calculate the second hash value based on the third plurality of control points and may compare the same with the second plurality of control points. The validation module 140 may validate the secure code when the first hash value and the second hash value matches upon comparison.

Figure 3:
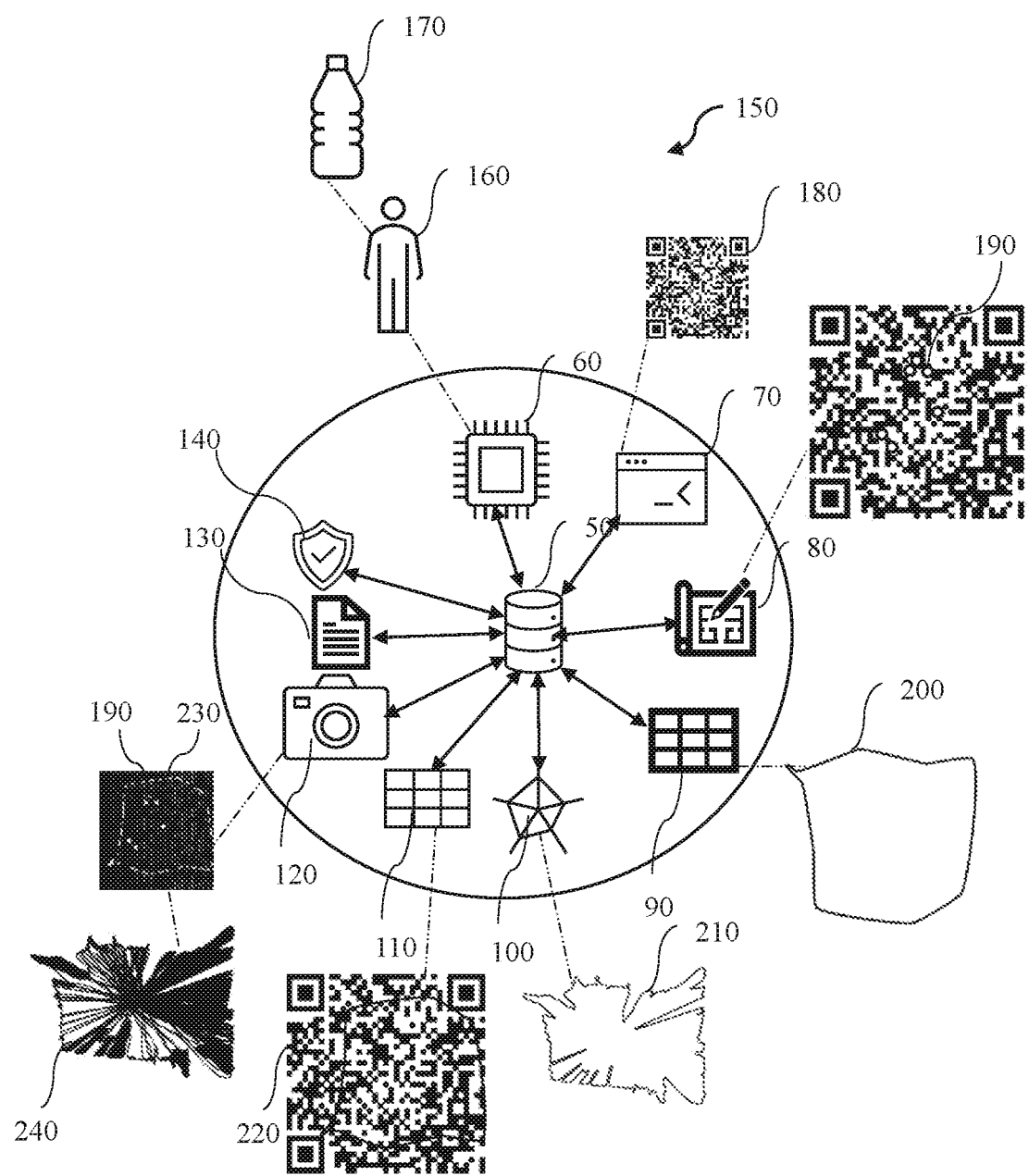
FIG. 3 is a schematic representation of an exemplary embodiment of the system of FIG. 1, in accordance with an embodiment of the present disclosure.

FIG. 3 is a schematic representation of an exemplary embodiment 150 of the system 10 of FIG. 1 in accordance with an embodiment of the present disclosure. For example, consider a scenario in which a manufacturer A 160 is interested to generate the secure code for authenticating a product X 170. The data acquisition module 60 may acquire the serial number and the manufacturing date of the product X 170 from the manufacturer A 160. The code generation module 70 may generate the code 180 based on the serial number and the manufacturing date of the product X 170. The watermarking module 80 may watermark the first plurality of points 190 in the code 180. The visible pattern generation module 90 may generate the visible pattern 200 based on the first plurality of control points and the plurality of anchor points estimated based on the serial number and the manufacturing date of the product X 170. The concealed pattern generation module 100 may store the concealed pattern 210 generated based on the first plurality of points 190 and the visible pattern 200 in the integrated database 50. The overlay module 110 may further overlay the visible pattern 200 on the code 180 to provide the secure code 220.

Further, the scanning module 120 may capture the secure code 220 associated with the product X 170 using the camera associated with the phone of the end customer (not shown in FIG. 3). The scanning module 120 may analyze the secure code 220 using the key to calculate the value for regenerating the code 180. The scanning module 120 may subtract the code 180 regenerated from the secure code 220 to obtain the first plurality of points 190 and the plurality of discrete points 230. The scanning module 120 may brighten first plurality of points 190 and the plurality of discrete points 230 by warming up the first plurality of points 190 and the plurality of discrete points 230. The scanning module 120 may further interconnect the first plurality of points 190 and the plurality of discrete points 230 based on the predefined logic to obtain the reconstructed pattern 240 having the third plurality of control points. The scanning module 120 may compare the third plurality of control points with the second plurality of control points to obtain the similarity score. The scanning module 120 may authenticate the secure code 220 when the similarity score obtained is above the predefined threshold, thereby authenticating the product. Further, the record generation module 130 may store the first hash value generated based on the concealed pattern 210 in the blockchain network 40. The validation module 140 may calculate the second hash value based on the third plurality of control points. The validation module 140 may validate the secure code 220 when the first hash value and the second hash value matches upon comparison.

Figure 4:
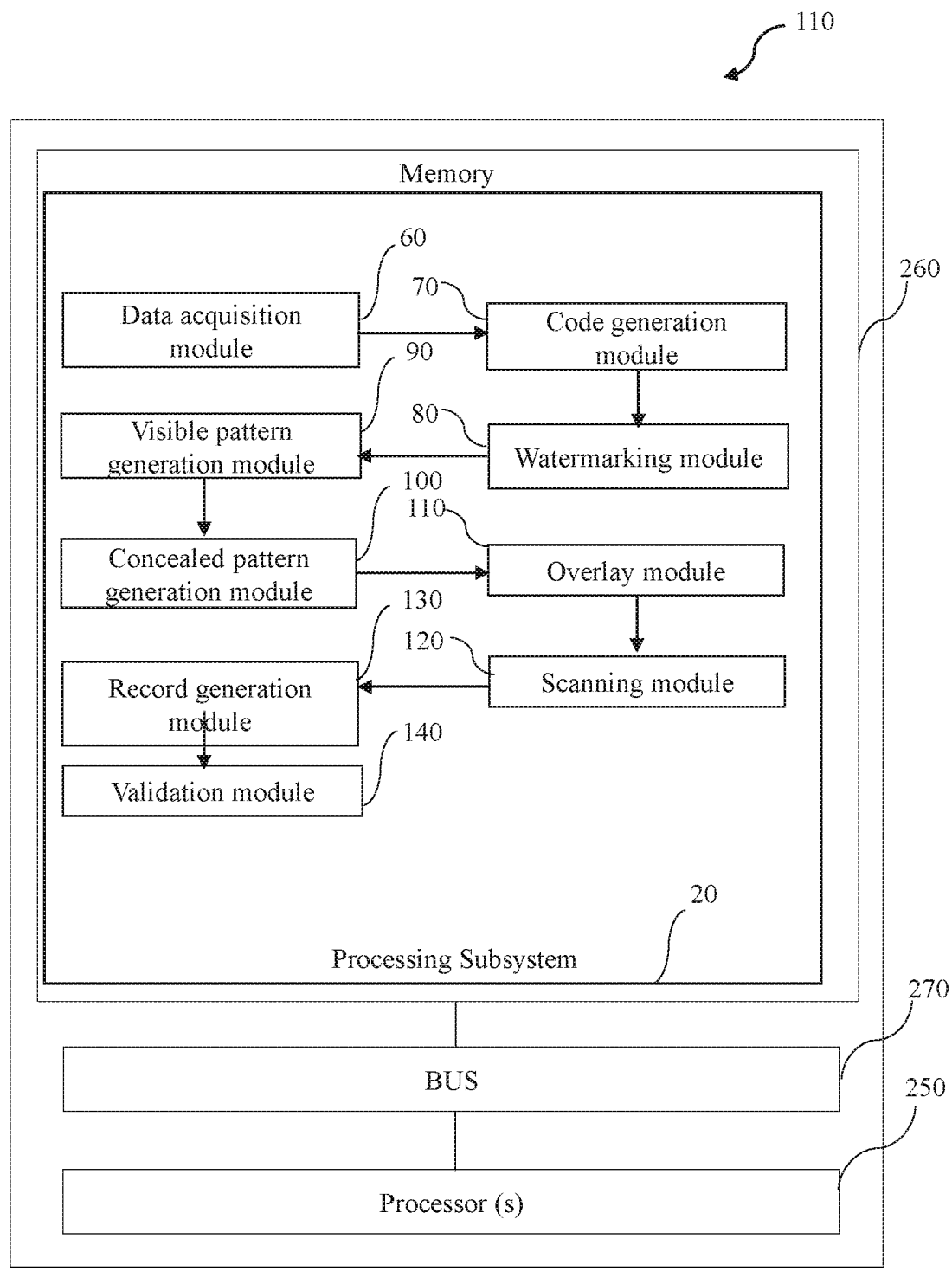
FIG. 4 is a block diagram of a computer or a server in accordance with an embodiment of the present disclosure.

FIG. 4 is a block diagram of a computer or a server 30 in accordance with an embodiment of the present disclosure. The server 30 includes processor(s) 250, and memory 260 operatively coupled to the bus 270. The processor(s) 250, as used herein, includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 260 includes several subsystems stored in the form of executable program which instructs the processor to perform the method steps illustrated in FIG. 1. The memory 260 is substantially similar to system 10 of FIG. 1. The memory 260 has the following subsystems: the processing subsystem 20 including the data acquisition module 60, the code generation module 70, the watermarking module 80, the visible pattern generation module 90, the concealed pattern generation module 100, the overlay module 110, the scanning module 120, the record generation module 130 and the validation module 140. The plurality of modules of the processing subsystem 20 performs the functions as stated in FIG. 1 and FIG. 2. The bus 270 as used herein refers to be the internal memory channels or computer network 40 that is used to connect computer components and transfer data between them. The bus 270 includes a serial bus or a parallel bus, wherein the serial bus transmit data in bit-serial format and the parallel bus transmit data across multiple wires. The bus 270 as used herein, may include but not limited to, a system bus, an internal bus, an external bus, an expansion bus, a frontside bus, a backside bus, and the like.

The processing subsystem 20 includes a data acquisition module 60 configured to acquire a plurality of product details associated with the product from a user. The processing subsystem 20 also includes a code generation module 70 configured to generate a code based on the plurality of product details. The processing subsystem 20 further includes a watermarking module 80 operatively coupled to the code generation module 70. The watermarking module 80 is configured to watermark a first plurality of points in the code based on the plurality of product details. The processing subsystem 20 also includes a visible pattern generation module 90 operatively coupled to the code generation module 70. The visible pattern generation module 90 is configured to analyze the plurality of product details to estimate a first plurality of control points and a plurality of anchor points. The visible pattern generation module 90 is also configured to generate a visible pattern based on the first plurality of control points and the plurality of anchor points estimated. The processing subsystem 20 also includes a concealed pattern generation module 100 operatively coupled to the visible pattern generation module 90. The concealed pattern generation module 100 is configured to store a concealed pattern generated based on the first plurality of points and the visible pattern in an integrated database 50. The concealed pattern includes a second plurality of control points. The processing subsystem 20 also includes an overlay module 110 operatively coupled to the pattern generation module. The overlay module 110 is configured to overlay the visible pattern on the code to provide the secure code. The processing subsystem 20 also includes a scanning module 120 operatively coupled to the overlay module 110. The scanning module 120 is configured to capture the secure code associated with the product using at least one image sensor associated with a user device. The scanning module 120 is also configured to analyze the secure code using a key to calculate a value for regenerating the code. The scanning module 120 is also configured to subtract the code regenerated from the secure code to obtain the first plurality of points and a plurality of discrete points. The scanning module 120 is further configured to interconnect the first plurality of points and the plurality of discrete points based on a predefined logic to obtain a reconstructed pattern including a third plurality of control points. The scanning module 120 is also configured to compare the third plurality of control points with the second plurality of control points to obtain a similarity score. The scanning module 120 is also configured to authenticate the secure code when the similarity score obtained is above a predefined threshold, thereby authenticating the product.

The processing subsystem 20 also includes a record generation module 130 configured to store a first hash value generated based on the concealed pattern in a blockchain network.

The processing subsystem 20 further includes a validation module 140 configured to calculate a second hash value based on the third plurality of control points. The validation module 140 is also configured to validate the secure code when a first hash value and the second hash value matches upon comparison.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 250.

Figure 5A:
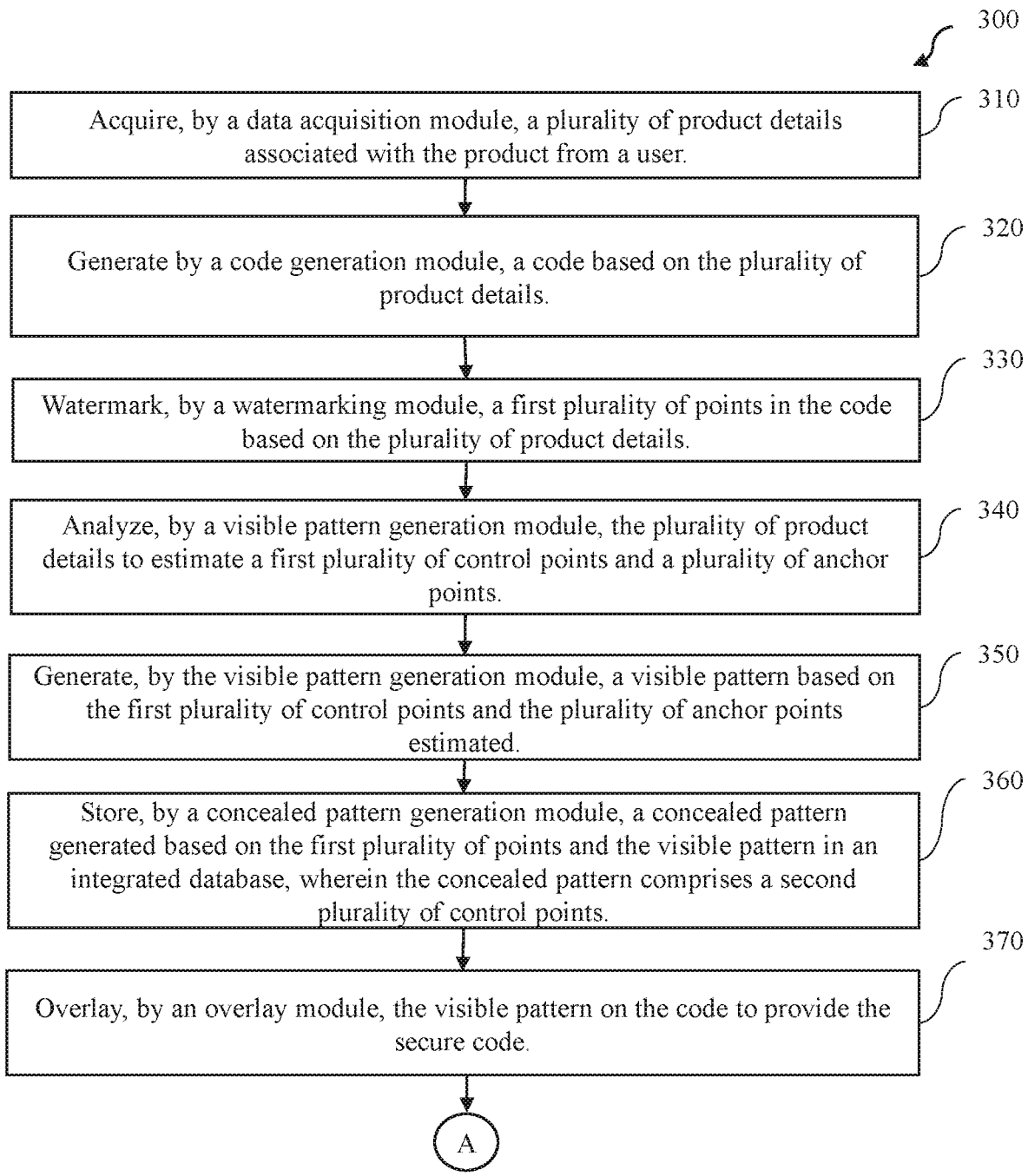
FIG. 5a is a flow chart representing the steps involved in a method to generate a secure code for authenticating a product in accordance with an embodiment of the present disclosure.
Figure 5B:
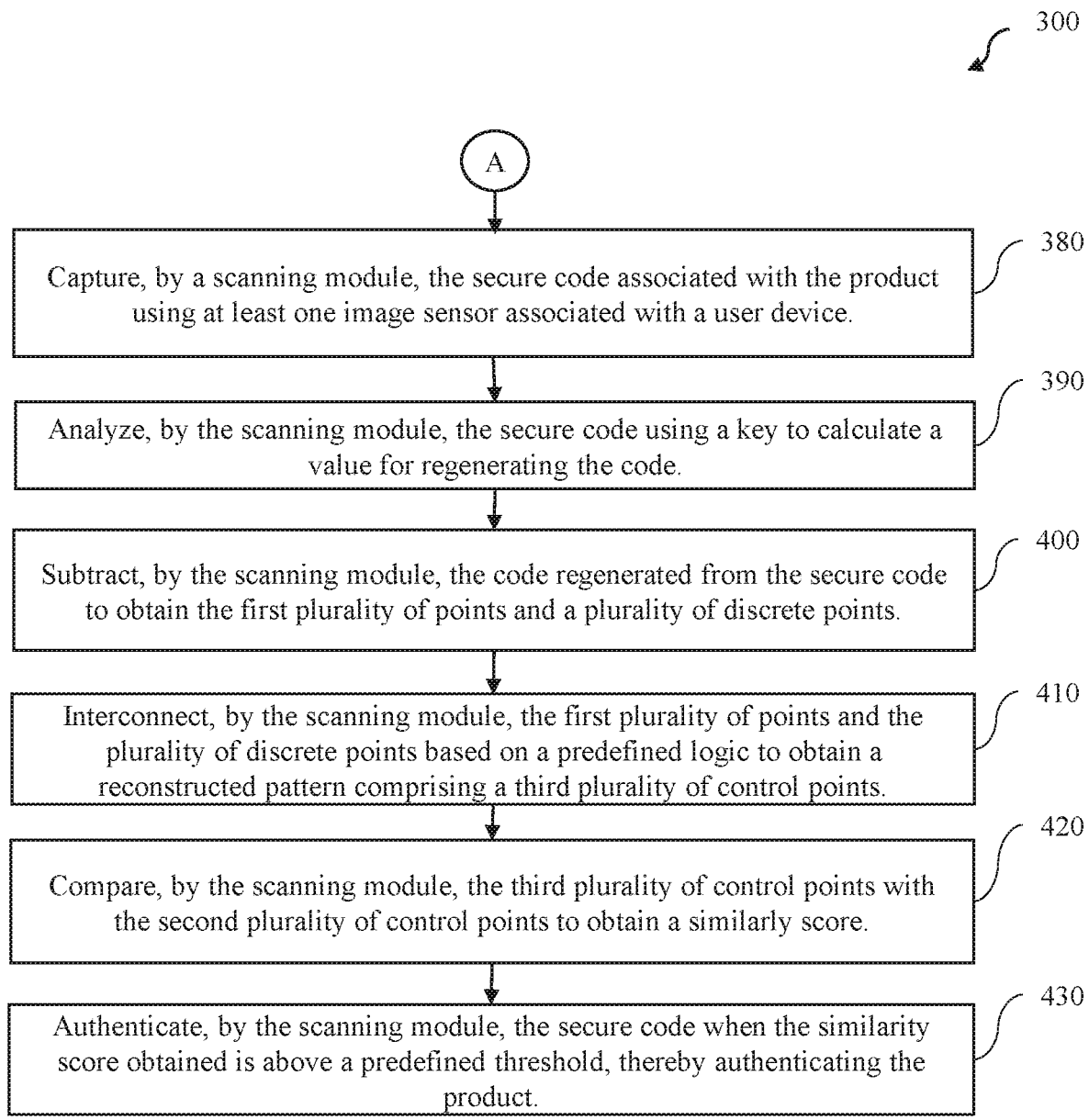
FIG. 5b is a flow chart representing the continued steps involved in a method of FIG. 5a, in accordance with an embodiment of the present disclosure.

FIG. 5a and FIG. 5b is a flow chart representing the steps involved in a method 300 to generate a secure code for authenticating a product in accordance with an embodiment of the present disclosure. The method 300 includes acquiring a plurality of product details associated with the product from a user in step 310. In one embodiment, acquiring a plurality of product details associated with the product from a user includes acquiring a plurality of product details associated with the product from a user by a data acquisition module. In one embodiment, the plurality of product details may include product ID, serial number, manufacturing date, manufacturing location, and expiry date. In some embodiments, the product may include personal care products, clothing products, food products, kitchen products, electronics products, cleaning products, health care products and the like. In a specific embodiment, the user may include manufacture of the product.

The method 300 also includes generating a code based on the plurality of product details in step 320. In one embodiment, generating a code based on the plurality of product details includes generating a code based on the plurality of product details by a code generation module. In some embodiments, the code may include a quick response code. In a specific embodiment, the code generation module may be configured to encrypt the plurality of product details to generate the code. In one embodiment, the code generation module may encrypt the plurality of product details by at least one of a technique including advanced encryption standard, rivest-shamir-adleman, data encryption standard, elliptic curve cryptography, a symmetric-key block cipher, rivest cipher 4, secure hash algorithm, message digest 5.

The method 300 also includes watermarking a first plurality of points in the code based on the plurality of product details in step 330. In one embodiment, watermarking a first plurality of points in the code based on the plurality of product details includes watermarking a first plurality of points in the code based on the plurality of product details by a watermarking module.

The method 300 also includes analysing the plurality of product details to estimate a first plurality of control points and a plurality of anchor points in step 340. In one embodiment, analysing the plurality of product details to estimate a first plurality of control points and a plurality of anchor points includes analysing the plurality of product details to estimate a first plurality of control points and a plurality of anchor points by a visible pattern generation module.

The method 300 also includes generating a visible pattern based on the first plurality of control points and the plurality of anchor points estimated in step 350. In one embodiment, generating a visible pattern based on the first plurality of control points and the plurality of anchor points estimated includes generating a visible pattern based on the first plurality of control points and the plurality of anchor points estimated by the visible pattern generation module.

The method 300 also includes storing a concealed pattern generated based on the first plurality of points and the visible pattern in an integrated database in step 360. In one embodiment, storing a concealed pattern generated based on the first plurality of points and the visible pattern in an integrated database includes storing a concealed pattern generated based on the first plurality of points and the visible pattern in an integrated database by a concealed pattern generation module. The concealed pattern includes a second plurality of control points. In one embodiment, the concealed pattern may be invisible with respect to the secure code.

The method 300 also includes overlaying the visible pattern on the code to provide the secure code in step 370. In one embodiment, overlaying the visible pattern on the code to provide the secure code includes overlaying the visible pattern on the code to provide the secure code by an overlay module.

The method 300 also includes capturing the secure code associated with the product using at least one image sensor associated with a user device in step 380. In one embodiment, capturing the secure code associated with the product using at least one image sensor associated with a user device includes capturing the secure code associated with the product using at least one image sensor associated with a user device by a scanning module. In some embodiments, the image sensor may include a camera. In one embodiment, the user device may include a phone, a computer, a personal digital assistant, a laptop and a tab. In one embodiment, the scanning module may be configured to perform one or more of perspective corrections on the secure code. In such an embodiment, the one or more perspective corrections may include at least one of a horizontal perspective correction, vertical perspective correction, two point perspective correction, three point perspective correction, radial perspective correction, keystone correction, and warping correction. In some embodiments, the scanning module may be configured to correct one or more distortions in the secure code. In such an embodiment, the one or more distortions may include a tilt and a skew. In one embodiment, the scanning module may be configured to identify one or more boundaries of the secure code using a gaussian blur technique. In such an embodiment, the scanning module may be configured to crop the secure code based on the one or more boundaries identified. In some embodiments, the scanning module may be configured to convert one or more gray scale regions in the secure code into one or more corresponding white regions to enhance legibility of the secure code.

The method 300 also includes analysing the secure code using a key to calculate a value for regenerating the code in step 390. In one embodiment, analysing the secure code using a key to calculate a value for regenerating the code includes analysing the secure code using a key to calculate a value for regenerating the code by the scanning module. In one embodiment, the key may be a combination of the plurality of product details.

The method 300 also includes subtracting the code regenerated from the secure code to obtain the first plurality of points and a plurality of discrete points in step 400. In one embodiment, subtracting the code regenerated from the secure code to obtain the first plurality of points and a plurality of discrete points includes subtracting the code regenerated from the secure code to obtain the first plurality of points and a plurality of discrete points by the scanning module.

The method 300 also includes interconnecting the first plurality of points and the plurality of discrete points based on a predefined logic to obtain a reconstructed pattern comprising a third plurality of control points in step 410. In one embodiment, interconnecting the first plurality of points and the plurality of discrete points based on a predefined logic to obtain a reconstructed pattern comprising a third plurality of control points includes interconnecting the first plurality of points and the plurality of discrete points based on a predefined logic to obtain a reconstructed pattern comprising a third plurality of control points by the scanning module. In one embodiment, the predefined logic may include one or more rules governing interconnection of the first plurality of points and the plurality of discrete points based on a corresponding position of the first plurality of points and the plurality of discrete points in a two dimensional plane.

The method 300 also includes comparing the third plurality of control points with the second plurality of control points to obtain a similarity score in step 420. In one embodiment, comparing the third plurality of control points with the second plurality of control points to obtain a similarity score includes comparing the third plurality of control points with the second plurality of control points to obtain a similarity score by the scanning module.

The method 300 further includes authenticating the secure code when the similarity score obtained is above a predefined threshold, thereby authenticating the product in step 430. In one embodiment, authenticating the secure code when the similarity score obtained is above a predefined threshold, thereby authenticating the product includes authenticating the secure code when the similarity score obtained is above a predefined threshold, thereby authenticating the product by the scanning module.

Various embodiments of the system and method to generate the secure code for authenticating the product described above enable various advantages. Combination of the data acquisition module, the code generation module, the watermarking module, the visible pattern generation module, and the concealed pattern generation module are capable generating and storing the concealed pattern in the integrated database. The scanning module is capable of obtaining the reconstructed pattern from the secure code and compare the reconstructed pattern with the concealed pattern stored in the integrated to authenticate the secure code, thereby making it impossible for the counterfeiters to duplicate the secure code. The overlay module negates the need of any additional printing equipments for obtaining the secure code, thereby making the system affordable. Provision of the record generation module is capable of storing the first hash value generated based on the concealed pattern in the blockchain network, thereby making the concealed pattern tamper proof. The validation module provides a way for validating the secure code by comparing the second hash value with the first hash value.

It will be understood by those skilled in the art that the foregoing general description and the following detailed description are exemplary and explanatory of the disclosure and are not intended to be restrictive thereof. While specific language has been used to describe the disclosure, any limitations arising on account of the same are not intended.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all the acts need to be necessarily performed. Also, those acts that are not dependent on other acts may be performed in parallel with the other acts. The scope of embodiments is by no means limited by these specific examples.

We claim:

1. A system to generate a secure code for authenticating a product comprising:
a processing subsystem hosted on a server and configured to execute on a network to control bidirectional communications among a plurality of modules comprising:
a data acquisition module configured to acquire a plurality of product details associated with the product from a user;
a code generation module configured to generate a code based on the plurality of product details;
a watermarking module operatively coupled to the code generation module, wherein the watermarking module is configured to watermark a first plurality of points in the code based on the plurality of product details;
a visible pattern generation module operatively coupled to the code generation module, wherein the visible pattern generation module is configured to:
analyze the plurality of product details to estimate a first plurality of control points and a plurality of anchor points;
generate a visible pattern based on the first plurality of control points and the plurality of anchor points estimated;
a concealed pattern generation module operatively coupled to the visible pattern generation module, wherein the concealed pattern generation module is configured to store a concealed pattern generated based on the first plurality of points and the visible pattern in an integrated database, wherein the concealed pattern comprises a second plurality of control points;
an overlay module operatively coupled to the pattern generation module, wherein the overlay module is configured to overlay the visible pattern on the code to provide the secure code;
a scanning module operatively coupled to the overlay module, wherein the scanning module is configured to:
capture the secure code associated with the product using at least one image sensor associated with a user device;
identify one or more boundaries of the secure code using a gaussian blur technique;
crop the secure code based on the one or more boundaries identified before analysing the secure code;
analyze the secure code using a key to calculate a value for regenerating the code;

subtract the code regenerated from the secure code to obtain the first plurality of points and a plurality of discrete points;

interconnect the first plurality of points and the plurality of discrete points based on a predefined logic to obtain a reconstructed pattern comprising a third plurality of control points;

compare the third plurality of control points with the second plurality of control points to obtain a similarity score; and authenticate the secure code when the similarity score obtained is above a predefined threshold, thereby authenticating the product.

2. The system of claim 1, wherein the plurality of product details comprises product ID, serial number, manufacturing date, manufacturing location, and expiry date.

3. The system of claim 1, wherein the code comprises a quick response code.

4. The system of claim 1, wherein the code generation module is configured to encrypt the plurality of product details to generate the code.

5. The system of claim 1, wherein the scanning module is configured to perform one or more of perspective corrections on the secure code before analyzing the secure code, wherein the one or more perspective corrections comprises at least one of a horizontal perspective correction, vertical perspective correction, two point perspective correction, three point perspective correction, radial perspective correction, keystone correction, and warping correction.

6. The system of claim 1, wherein the scanning module is configured to correct one or more distortions in the secure code before analyzing the secure code, wherein the one or more distortions comprises a tilt and a skew.

7. The system of claim 1, wherein the concealed pattern is invisible with respect to the secure code.

8. The system of claim 1, wherein the server comprises a local server.

9. The system of claim 1, wherein the server comprises a cloud server.

10. The system of claim 1, wherein the network comprises at least one of a local area network and a wide area network.

11. The system of claim 1, wherein the image sensor comprises a camera.

12. The system of claim 1, wherein the user device comprises a phone, a computer, a personal digital assistant, a laptop, and a tab.

13. The system of claim 1, wherein the key is a combination of the plurality of product details.

14. The system of claim 1, wherein the predefined logic comprises one or more rules governing interconnection of the first plurality of points and the plurality of discrete points based on a corresponding position of the first plurality of points and the plurality of discrete points in a two dimensional plane.

15. The system of claim 1, wherein the scanning module is configured to convert one or more gray scale regions in the secure code into one or more corresponding white regions to enhance legibility of the secure code before analyzing the secure code.

16. The system of claim 1, wherein the processing subsystem comprises a record generation module configured to store a first hash value generated based on the concealed pattern in a blockchain network.

17. The system of claim 1, wherein the processing subsystem a validation module configured to:

calculate a second hash value based on the third plurality of control points; and validate the secure code when a first hash value and the second hash value matches upon comparison.

18. A method to generate a secure code for authenticating a product comprising:

acquiring, by a data acquisition module, a plurality of product details associated with the product from a user;

generating, by a code generation module, a code based on the plurality of product details;

watermarking, by a watermarking module, a first plurality of points in the code based on the plurality of product details;

analysing, by a visible pattern generation module, the plurality of product details to estimate a first plurality of control points and a plurality of anchor points;

generating, by the visible pattern generation module, a visible pattern based on the first plurality of control points and the plurality of anchor points estimated;

storing, by a concealed pattern generation module, a concealed pattern generated based on the first plurality of points and the visible pattern in an integrated database, wherein the concealed pattern comprises a second plurality of control points;

overlaying, by an overlay module, the visible pattern on the code to provide the secure code;

capturing, by a scanning module, the secure code associated with the product using at least one image sensor associated with a user device;

identifying one or more boundaries of the secure code using a gaussian blur technique;

cropping the secure code based on the one or more boundaries identified before analysing the secure code;

analysing, by the scanning module, the secure code using a key to calculate a value for regenerating the code;

subtracting, by the scanning module, the code regenerated from the secure code to obtain the first plurality of points and a plurality of discrete points;

interconnecting, by the scanning module, the first plurality of points and the plurality of discrete points based on a predefined logic to obtain a reconstructed pattern comprising a third plurality of control points;

comparing, by the scanning module, the third plurality of control points with the second plurality of control points to obtain a similarity score; and authenticating, by the scanning module, the secure code when the similarity score obtained is above a predefined threshold, thereby authenticating the product.

19. A non-transitory computer-readable medium storing a computer program that, when executed by a processor, causes the processor to perform a method generate a secure code for authenticating a product, wherein the method comprises:

acquiring, by a data acquisition module, a plurality of product details associated with the product from a user;

generating, by a code generation module, a code based on the plurality of product details;

watermarking, by a watermarking module, a first plurality of points in the code based on the plurality of product details;

analysing, by a visible pattern generation module, the plurality of product details to estimate a first plurality of control points and a plurality of anchor points;

generating, by the visible pattern generation module, a visible pattern based on the first plurality of control points and the plurality of anchor points estimated;

storing, by a concealed pattern generation module, a concealed pattern generated based on the first plurality of points and the visible pattern in an integrated database, wherein the concealed pattern comprises a second plurality of control points;

overlaying, by an overlay module, the visible pattern on the code to provide the secure code;

capturing, by a scanning module, the secure code associated with the product using at least one image sensor associated with a user device;

identifying one or more boundaries of the secure code using a gaussian blur technique;

cropping the secure code based on the one or more boundaries identified before analysing the secure code;

analysing, by the scanning module, the secure code using a key to calculate a value for regenerating the code;

subtracting, by the scanning module, the code regenerated from the secure code to obtain the first plurality of points and a plurality of discrete points;

interconnecting, by the scanning module, the first plurality of points and the plurality of discrete points based on a predefined logic to obtain a reconstructed pattern comprising a third plurality of control points;

comparing, by the scanning module, the third plurality of control points with the second plurality of control points to obtain a similarity score; and authenticating, by the scanning module, the secure code when the similarity score obtained is above a predefined threshold, thereby authenticating the product.

* * * * *